the speed of the device. The inclusion of

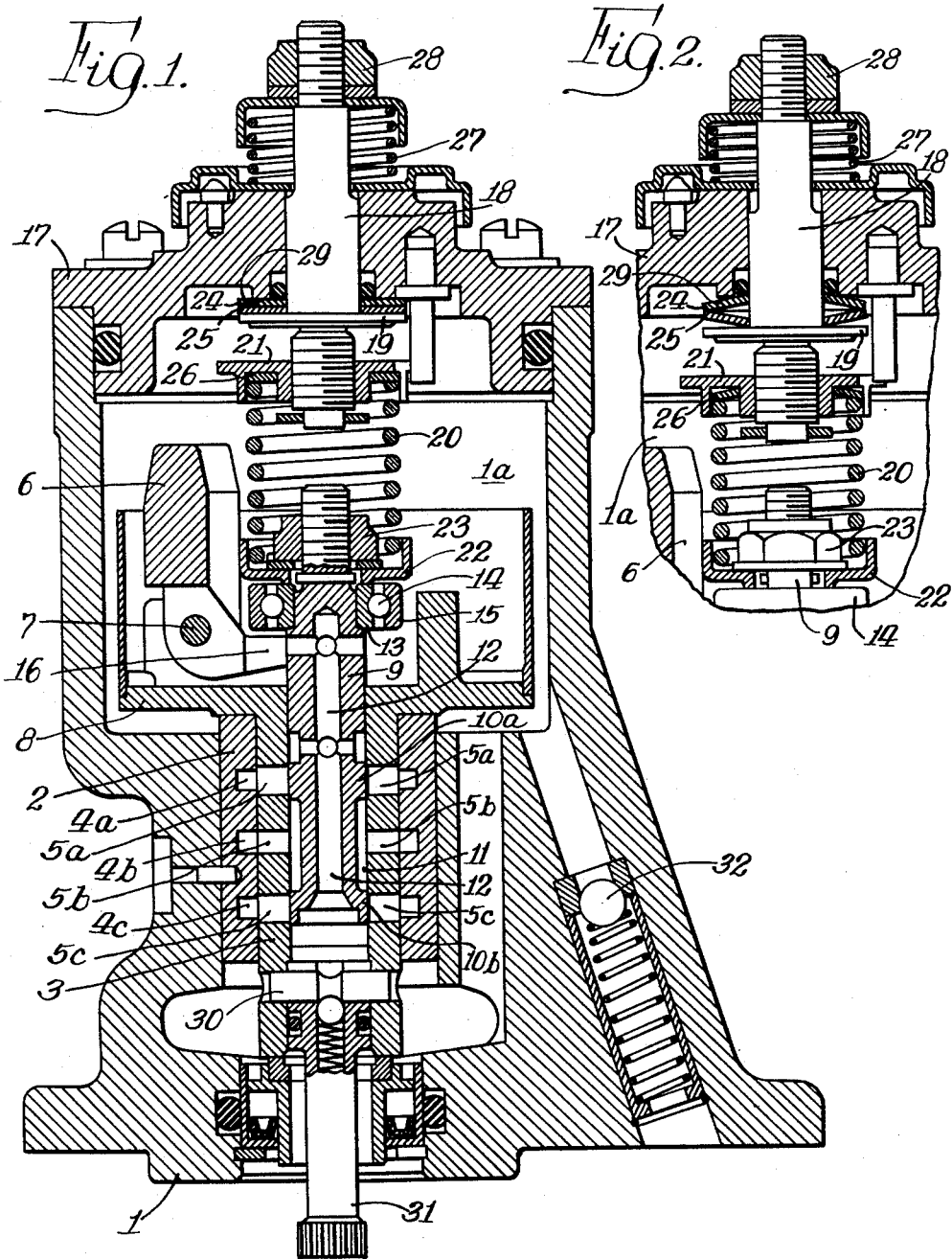

United States Patent Office 2,915,076
Patented Dec. 1, 1959

2,915,076

TEMPERATURE COMPENSATING DEVICE

Kenneth A. Teumer, Rockford, Ill., assignor to Sundstrand Corporation, a corporation of Illinois Application July 26, 1954, Serial No. 445,579

1 Claim. (Cl. 137—51)

This invention relates to a governor used to control the speed of a device and having means adapted to compensate for any change in speed resulting from a change in the operating temperature of said device.

Flyball governors are often used to operate a speed control device for a mechanism to be operated at a predetermined speed. In such a governor, a shaft carrying the pivotally mounted flyballs is driven at a speed corresponding to the speed of the mechanism to be controlled. As the shaft speed increases, the flyballs are centrifugally forced outwardly so as to have an effect on the speed control device. A resilient means is generally provided to work against this flyball action and has an opposite effect on the speed control device.

In some of these control systems flow of a hydraulic fluid is controlled by the governor and used to operate the speed control device. Often such a hydraulic fluid control system operates through a wide temperature range, as from —65° F. to 350° F. A major problem arises where the temperature of the hydraulic control fluid increases because as the temperature of the fluid increases the fluid becomes much less viscous. This less viscous fluid thus has a definite tendency to leak around valves and pistons, etc., thus causing the mechanism whose speed is to be controlled to operate at a speed different than desired. This droop in the speed of a mechanism to be operated at a predetermined speed, at high temperatures, is a serious problem, and it is the general object of this invention to provide a governor that automatically compensates for such a droop in speed at high temperatures.

Another object of this invention is to provide a flyball governor utilizing hydraulic fluid means to control the speed of a device and having means compensating for a droop in output speed at high temperatures due to leakage of the control fluid.

A further object is to provide a flyball governor for controlling a device at a predetermined speed having means responsive to an increase in temperature to compensate for a droop in speed encountered at high temperatures.

Yet another object of this invention is to provide a governor having a member controlled in one direction by the action of rotatable flyballs and in the other direction by a biasing means, the effect of which varies proportionally to the operating temperature of the governor.

Yet another object is to provide means for compensating for a reduction in output speed, at high temperatures, of a mechanism to be controlled at a predetermined speed by a flyball governor due to leakage of hydraulic control fluid as a result of the decreased viscosity of said fluid at high temperatures, said governor having resilient means opposing the effect of the flyballs on the control member, and bimetallic washers responsive to an increase in temperature to proportionally vary the effect of said resilient means.

Other objects of the invention will become apparent from the following detailed description taken in connection with the accompanying drawings, in which:

Fig. 1 is a sectional view of the governor assembly showing the bimetallic washers in a normal non-distorted condition;

Fig. 2 is a partial sectional view of the governor assembly shown in Fig. 1, but showing the bimetallic washers in a distorted, high operating temperature condition.

While the invention herein disclosed is a preferred embodiment, it is not intended to limit the invention to the specific form and arrangement shown, it being contemplated that various changes may be made by those skilled in the art without departing from the spirit and scope of the invention as pointed out in the appended claim.

As shown in Fig. 1, the governor assembly includes a casing 1, defining a chamber 1a, in which casing there is mounted an annular bushing 2 which rotatably supports a sleeve 3, said bushing 2 having a series of annular grooves 4a, 4b and 4c, corresponding with inlet and outlet ports 5a, 5b and 5c, in sleeve 3. Although not shown in the drawings, grooves 4a and 4c are connected through passages in casing 1 to opposite sides of a control device, as a hydraulic transmission, while groove 4b is connected to a source of hydraulic fluid under pressure. Rotatable means responsive to the speed of the device being controlled are provided, as flyweights 6 pivotally mounted at 7 on an upper flanged portion 8 of rotatable sleeve 3.

Reciprocably mounted in sleeve 3 is a spool valve member 9 having means, as lands 10a and 10b, for controlling the hydraulic fluid flow through inlet and outlet ports 5a and 5c, through reduced portion 11. Drainage means for inlet and outlet ports 5a and 5c are provided by passages 12 in valve member 9. An inner race 13 of a ball type bearing is secured near the upper end of valve member 9 with the outer race 15 being in engagement with arms 16 of pivotally mounted flyballs 6.

Vertically and slidably mounted in an upper casing portion 17 of the governor assembly is a rod 18 having a flanged portion 19 near its lower end. Resilient means, in the form of a spring 20, is positioned so as to act on valve member 9. The upper end of spring 20 is received by a spring seat member 21 secured to the lower end of rod 18, while the lower end of spring 20 is received by a circular cup-shaped member 22 secured by means of a nut 23 to the upper end of valve member 9.

Members responsive to a change in temperature are provided and positioned so as to vary, proportionally with the temperature, the effect of the spring 20 on valve member 9. In the preferred embodiment of the invention illustrated in the drawings, the temperature responsive members are shown as bimetallic washers 24, 25 and 26.

Disc-shaped bimetallic washers 24 and 25 are positioned to surround rod 18 and are in engagement with the upper surface of flanged portion 19. Rod 18 is slidably mounted in the upper casing portion 17 and urged into its upper position by means of a spring 27 and a nut 28 so that bimetallic washers 24 and 25 are held between flanged portion 19 of rod 18 and a shoulder 29 formed in the upper casing portion 17. Another disc-shaped bimetallic washer 26 is positioned between the under surface of spring seat member 21 and the upper end of spring 20. As will be clear from the foregoing and from an inspection of the drawings, adjustment of the nut 28 serves to adjust the compression of the spring 27, which acts in opposition to the bimetallic washers 24 and 25. Thus, increasing the compression of the spring 27 increases the resistance offered to changes in shape of the bimetallic washers from that shown in Fig. 1 to the shape shown in Fig. 2. Thus adjustment of the nut 28 may be used for calibration if desired.

Rotatable sleeve 3 is driven by means of a pin arrangement 30 from shaft 31 which is driven at a speed corresponding to the speed of the mechanism being controlled. A check valve 32 is provided as a drain for the control fluid from drain passages 12 and chamber 1a.

As to the operation of this invention, the sleeve 3 is driven from shaft 31 so that if the speed of the mechanism being controlled increases the flyballs 6 are pivoted outwardly by the centrifugal force of rotation raising arm 16 against the outer race 15 of ball type bearing 14, thereby shifting valve member 9 upwardly against the force of spring 20. This upward shift of valve member 9 causes land 10a to uncover a larger portion of port 5a so that more fluid flows through port 5a from pressure port 5b, thereby increasing the fluid pressure on one side of the control device. Simultaneously, land 10b uncovers more of port 5c so as to allow fluid to drain from the opposite side of the control device through port 5c and thus to drain passages 12. Thus, the speed of the mechanism being controlled is brought back to the predetermined speed. Conversely, if the speed decreases, the action of spring 20 overcomes centrifugal action of the flyball 6 and shifts valve member 9 downwardly to change the valve setting so as to reverse the above described fluid flow to increase the speed of the device.

As the temperature of the hydraulic fluid in the system increases, there is a substantial leakage of the fluid due to its decreased viscosity. This loss of fluid pressure acting on the control device causes the mechanism being controlled, to operate at a lower speed than desired.

The disc-shaped bimetallic washers 24, 25 and 26 are provided and positioned in such a manner as to vary, proportionally with the temperature change, the biasing effect of the spring 20 on the valve member 9. This changes the hydraulic fluid effect on the control device so as to compensate for the droop in operating speed.

As the operating temperature of the hydraulic fluid circulating in the casing passages increases, the temperature of the bimetallic washers also increases so that they tend to become saucer-shaped, thereby increasing their overall height, as shown in Fig. 2. This change of shape of washers 24 and 25 acts on flanged portion 19 of rod 18, compressing spring 27, to move rod 18 downwardly to increase the compression of spring 20. In the same manner the change in shape of washer 26 increases the compression of spring 20 by acting directly thereon. The combined effect of the change in shape of these washers on the compressive force of spring 20 causes valve member 9 to move upwardly a lesser amount in response to the action of flyballs 6. Thus, the decrease in fluid pressure acting on the controlled device at high temperatures and the resulting speed droop of the mechanism being controlled is compensated for and the mechanism operates substantially at the predetermined speed through a wide temperature range.

I claim:

A flyweight governor comprising, a hollow casing; a valve bore in the casing having inlet and outlet ports opening thereinto; a control valve slidable in the bore for controlling the flow of fluid through said ports; means connecting the control valve to the flyweights for shifting the control valve in one direction; a spring seat mounted on one end of said control valve; a rod slidable through a wall of the casing generally in alignment with said control valve, said rod having a portion exterior of the casing; a compression spring surrounding said portion of the rod; means on said portion of the rod for adjusting the compression of said spring, said spring bearing at one end against the casing and at its other end against said compression adjusting means; a flange formed on a portion of said rod within the hollow casing; a speeder spring seat secured to the inner end of said rod; a coiled compression speeder spring seating on said spring seats to oppose movement of said control valve by said flyweights; and a pair of bimetallic washers positioned on said rod between said flange and the inner surface of said casing, said washers being adapted to change shape in response to an increase in temperature to move the rod toward the control valve against the bias of the first mentioned spring to increase the bias of said speeder spring, said spring compression adjusting means being operable to adjust the compression of the first-mentioned spring whereby to vary the response of said bimetallic washers to changes in temperatures.

References Cited in the file of this patent
UNITED STATES PATENTS

| | | |
|---|---|---|
| 668,766 | Bickel | Feb. 26, 1901 |
| 1,721,321 | Skinner | July 16, 1929 |
| 1,813,122 | Moore | July 7, 1931 |
| 2,194,274 | Boyd | Mar. 19, 1940 |
| 2,397,876 | Martin et al. | Apr. 2, 1946 |
| 2,590,111 | MacCracken | Mar. 25, 1952 |
| 2,667,345 | Dale | Jan. 26, 1954 |